United States Patent
Wang et al.

(10) Patent No.: US 11,928,792 B2
(45) Date of Patent: Mar. 12, 2024

(54) FUSION NETWORK-BASED METHOD FOR IMAGE SUPER-RESOLUTION AND NON-UNIFORM MOTION DEBLURRING

(71) Applicant: XI'AN JIAOTONG UNIVERSITY, Shaanxi (CN)

(72) Inventors: Fei Wang, Shaanxi (CN); Xinyi Zhang, Shaanxi (CN); Hang Dong, Shaanxi (CN); Kanglong Zhang, Shaanxi (CN); Zhao Wei, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 451 days.

(21) Appl. No.: 17/149,764

(22) Filed: Jan. 15, 2021

(65) Prior Publication Data
US 2021/0166350 A1  Jun. 3, 2021

Related U.S. Application Data
(63) Continuation of application No. PCT/CN2018/107710, filed on Sep. 26, 2018.

(30) Foreign Application Priority Data
Jul. 17, 2018  (CN) .......................... 201810785846.9

(51) Int. Cl.
*G06T 3/40* (2006.01)
*G06F 18/214* (2023.01)
(Continued)

(52) U.S. Cl.
CPC .......... *G06T 3/4053* (2013.01); *G06F 18/214* (2023.01); *G06F 18/251* (2023.01);
(Continued)

(58) Field of Classification Search
None
See application file for complete search history.

(56) References Cited

U.S. PATENT DOCUMENTS

| | | | |
|---|---|---|---|
| 8,995,781 B2 | 3/2015 | Cho et al. | |
| 9,042,673 B2 | 5/2015 | Cho et al. | |
| (Continued) | | | |

FOREIGN PATENT DOCUMENTS

| | | | |
|---|---|---|---|
| CN | 102194222 A | 9/2011 | |
| CN | 102682442 A | 9/2012 | |
| (Continued) | | | |

OTHER PUBLICATIONS

Xiangyu Xu, Deqing Sun, Jinshan Pan, Yujin Zhang, Hanspeter Pfister, Ming-Hsuan Yang, Learning to Super-Resolve Blurry Face and Text Images, Proceedings of the IEEE International Conference on Computer Vision (ICCV), 2017: 251-260.
(Continued)

*Primary Examiner* — Leon Flores (57) ABSTRACT

Disclosed is a fusion network-based method for image super-resolution and non-uniform motion deblurring. The method achieves, for the first time, restoration of a low-resolution non-uniform motion-blurred image based on a deep neural network. The network uses two branch modules to respectively extract features for image super-resolution and non-uniform motion deblurring, and achieves, by means of a feature fusion module that is trainable, adaptive fusion of outputs of the two branch modules for extracting features. Finally, an upsampling reconstruction module achieves a non-uniform motion deblurring and super-resolution task. According to the method, a self-generated set of training data is configured to perform offline training on a network, thereby achieving restoration of the low-resolution non-uniform motion-blurred image.

6 Claims, 3 Drawing Sheets

(51) Int. Cl.
  *G06F 18/25* (2023.01)
  *G06N 3/08* (2023.01)
  *G06T 5/00* (2006.01)
  *G06V 10/774* (2022.01)
  *G06V 10/80* (2022.01)

(52) U.S. Cl.
  CPC ............ *G06N 3/08* (2013.01); *G06T 3/4076* (2013.01); *G06T 5/003* (2013.01); *G06V 10/774* (2022.01); *G06V 10/803* (2022.01); *G06V 10/806* (2022.01)

(56) References Cited

U.S. PATENT DOCUMENTS

| | | | |
|---|---|---|---|
| 9,443,288 | B1 | 9/2016 | Yang |
| 9,619,870 | B2 | 4/2017 | Yang |
| 9,692,939 | B2 * | 6/2017 | Irani ................... H04N 1/4092 |
| 10,091,405 | B2 * | 10/2018 | Molina ................. H04N 23/70 |
| 2011/0188770 | A1 | 8/2011 | Weinberger et al. |
| 2013/0016239 | A1 | 1/2013 | Cho et al. |
| 2013/0058588 | A1 | 3/2013 | Wang et al. |
| 2013/0243319 | A1 | 9/2013 | Cho et al. |
| 2013/0243346 | A1 | 9/2013 | Cho et al. |
| 2016/0163021 | A1 | 6/2016 | al-Salem et al. |
| 2016/0335747 | A1 | 11/2016 | Yang |
| 2017/0024855 | A1 | 1/2017 | Liang et al. |

FOREIGN PATENT DOCUMENTS

| | | |
|---|---|---|
| CN | 103310413 A | 9/2013 |
| CN | 103310430 A | 9/2013 |
| CN | 103514580 A | 1/2014 |
| CN | 104680491 A | 6/2015 |
| CN | 104867111 A | 8/2015 |
| CN | 104680491 B | 3/2016 |
| CN | 106373107 A | 2/2017 |
| CN | 104867111 B | 8/2017 |
| CN | 103310413 B | 9/2017 |
| CN | 103310430 B | 10/2017 |
| CN | 107274378 A | 10/2017 |
| CN | 107301662 A | 10/2017 |
| CN | 107610194 A | 1/2018 |
| CN | 107730453 A | 2/2018 |
| CN | 108109121 A | 6/2018 |
| CN | 108230223 A | 6/2018 |
| EP | 2523160 A1 | 11/2012 |
| JP | 2013192224 A | 9/2013 |
| JP | 2013192227 A | 9/2013 |
| JP | 6218402 B2 | 10/2017 |
| KR | 20130007889 A | 1/2013 |
| KR | 20130104258 A | 9/2013 |
| KR | 20130104259 A | 9/2013 |
| KR | 101791573 B1 | 10/2017 |
| KR | 101810876 B1 | 1/2018 |
| KR | 101839617 B1 | 3/2018 |
| KR | 101844332 B1 | 4/2018 |

OTHER PUBLICATIONS

Xinyi Zhang, Fei Wang, Hang Dong, Yu Guo, A Deep Encoder-Decoder Networks for Joint Deblurring and Super-Resolution, 2018 IEEE International Conference on Acoustics, Speech and Signal Processing (ICASSP), IEEE, 2018: 1448-1452.

* cited by examiner

FUSION NETWORK-BASED METHOD FOR IMAGE SUPER-RESOLUTION AND NON-UNIFORM MOTION DEBLURRING

CROSS-REFERENCE TO RELATED APPLICATION

The present application is a continuation of International Application No. PCT/CN2018/107710, filed on Sep. 26, 2018, which claims priority to Chinese patent application No. 201810785846.9, filed on Jul. 17, 2018, both of which are hereby incorporated by reference in their entireties.

TECHNICAL FIELD

The present disclosure relates to the field of computer vision and image processing, and more particularly, to a fusion network-based method for image super-resolution and non-uniform motion deblurring.

BACKGROUND

Image super-resolution is a basic task in computer vision applications, aiming to restore high-resolution images from low-resolution images while improving image quality and restoring detail information of images. It can not only generate satisfying high-resolution images, but also provide higher-quality image source for a deeper level of image processing such as target detection and face recognition. However, since there are moving objects with different depths and motion occlusions in natural images, non-uniform motion-blurred phenomena often exist in real low-resolution images. Consequently, researches of super-resolution algorithms can be significantly affected.

Different from a uniform motion-blurred image, a non-uniform motion-blurred image is formed by fusion of adjacent frames in a clear video. The fusion process is represented by Formula 1:

$$H_{blur} = g\left(\frac{1}{M}\sum_{i=0}^{M-1} g^{-1}(\hat{H}[i])\right), \quad (1)$$

where M denotes a number of consecutive frames for generating a non-uniform motion-blurred image, $\hat{H}[i]$ denotes an i-th frame of image captured by a camera, and g denotes a camera response function configured to represent a mapping relationship between a brightness received by a photosensitive element and a pixel value of the captured image. An approximate relationship of g is represented by Formula 2:

$$g(x)=x^{1/\gamma} \quad (2).$$

On this basis, a low-resolution non-uniform motion-blurred image $L_{blur}$ is obtained by downsampling a blurred image $H_{blur}$ in Formula 1, and is represented by Formula 3:

$$L_{blur}=D(H_{blur}) \quad (3),$$

where D denotes a downsampling interpolation algorithm.

According to the above formulas, it may be seen that the low-resolution non-uniform motion-blurred image is formed by superimposing of two degradation models. It is a highly ill-conditioned problem to recover a high-resolution sharp image from a single frame of low-resolution non-uniform motion-blurred image. Therefore, in the existing related research, image super-resolution and non-uniform motion deblurring of an image are often researched as two independent issues. The non-uniform motion deblurring of the image is a method to restore a sharp image from a highly complex and blurred image. Non-uniform motion blur, which takes into account different depths of moving objects and a phenomenon of motion occlusion in a real-world scenario, is a more complex image degradation model than uniform motion blur. In recent years, with the maturity of deep neural network technology, the research on the non-uniform motion deblurring has made significant progress. However, in a case where both the above two degradation models exist in an image to be processed, although a blur phenomenon may be removed with the above algorithms, neither the image resolution may be increased, nor the detail information may be recovered, such that the quality of an output image is unable to meet an expected effect. Similarly, existing super-resolution algorithms cannot effectively eliminate the motion blur phenomenon in the image, resulting in that the generated high-resolution image still has a severely blurred area.

Existing methods to achieve super-resolution and non-uniform motion deblurring include: (1) a simple concatenation method, that is, a simple concatenation of methods for handling two types of tasks, in which one degradation model is processed first, and a result of the one degradation model is used as an input of another method to eliminate a second degradation model, one main disadvantage of the simple serial method is that it cannot guarantee an optimal solution of a problem to be obtained as that an error caused by the first method will be further amplified in the second method, and the serial connection prevents middle features in the first method from being effectively reused in the second method, resulting in a relatively low operating efficiency; and (2) an end-to-end deep neural network training method, which utilizes the powerful learning ability of a deep neural network and use a large number of training samples to enable the network to perform both super-resolution and motion deblurring. The representative literatures of these methods are [1] and [2] as listed below. However, these methods focus on processing uniform motion blur [1] or Gaussian blur [2]. When these methods are applied to the more complex non-uniform motion blur scenes, results obtained by these methods are far from meeting the actual application requirements.

[1] Xu X, Sun D, Pan J, et al. Learning to super-resolve blurry face and text images[C]//Proceedings of the IEEE international conference on computer vision (ICCV). 2017: 251-260.

[2] Zhang X, Wang F, Dong H, et al. A deep encoder-decoder networks for joint deblurring and super-resolution[C]// 2018 IEEE International Conference on Acoustics, Speech and Signal Processing (ICASSP). IEEE, 2018: 1448-1452.

SUMMARY

An objective of the present disclosure is to provide a fusion network-based method for image super-resolution and non-uniform motion deblurring, so as to solve the above problems.

To implement the above objective, the present disclosure adopts the following technical solutions.

A fusion network-based method for image super-resolution and non-uniform motion deblurring, including:

step 1: preprocessing an original video to obtain a set of triples of image patches as training and testing data: converting a number of segments of videos captured by a high-speed motion camera into a plurality of triples of image patches {$l_{blur}$, l, h} that are spatially aligned, where $l_{blur}$ denotes a non-uniform motion-blurred image patch at a low resolution and serves as an input of neural network training; and l and h denote a low-resolution sharp image patch and a high-resolution sharp image patch, respectively, and serve as true values of different branches in the neural network training;

step 2: building a deep neural network: using, by the deep neural network, two branch modules to respectively extract features for image super-resolution and for non-uniform motion deblurring, and performing, by the deep neural network, adaptive fusion on the features extracted by the two branch modules through a feature fusion module that is trainable; and using an upsampling reconstruction module to perform a super-resolution and non-uniform motion deblurring task;

step 3: model training: using the triples of image patches of a training set obtained in the step 1 to update parameters of the built neural network to obtain a network model for restoring a low-resolution non-uniform motion-blurred image; and step 4: model test: preprocessing the low-resolution non-uniform motion-blurred image to be processed, and inputting the low-resolution non-uniform motion-blurred image into a neural network model that has been trained, to obtain a high-resolution sharp image.

Further, a process of generating the triples of image patches in the step 1 includes:

substep 1: randomly sampling N frames of images from a plurality of segments of real-scene videos as a set H of ground truth images of the training set; for each frame of image $H_i$ in the set of ground truth images, sampling, by taking the frame of image $H_i$ as a center, M frames of images adjacent to the frame of image $H_i$ and the frame of image $H_i$ to form a set T of images, T= {$H_{i-(M-1)/2}$, ..., $H_i$, ..., $H_{i+(M-1)/2}$}, where a subscript denotes a frame number of an image; and generating the set T of images into a set $H_{blur}$ of high-resolution blurred images based on a formula $$H_{blur} = g\left(\frac{1}{M}\sum_{i=0}^{M-1} g^{-1}(H_i)\right),$$

where M denotes a number of consecutive frames for generating non-uniform motion-blurred images, $H_i$ denotes an i-th frame of image captured by the high-speed motion camera, and g denotes a camera response function configured to represent a mapping relationship between a brightness received by a photosensitive element and a pixel value of an image that is captured, an approximate function of g being $g(x)=x^{1/\gamma}$; and substep 2: for N pairs of high-resolution sharp/blurred images {H, $H_{blur}$} generated in the substep 1, downsampling each of the N pairs of high-resolution sharp/blurred images {H, $H_{blur}$} with three zooming scales {0.5, 0.7, 1} to obtain 3*N pairs of high-resolution sharp/blurred images; for the 3*N pairs of high-resolution sharp/blurred images, cropping a set of image patches of a size M*M using a sliding window with a stride of S; for each pair of high-resolution image patches {h, $h_{blur}$}, performing downsampling using a formula L=D(H) to obtain a pair of low-resolution image patches {l, $l_{blur}$}, where D denotes a downsampling interpolation algorithm, H denotes a high-resolution image, and L denotes a low-resolution image obtained after the downsampling; and obtaining each of the plurality of pairs of triples of image patches {$l_{blur}$, l, h} in the step 1, the downsampling being bicubic interpolation downsampling.

Further, in the step 2, a module of the neural network for extracting a deblurring feature adopts an encoding-decoding structure, the encoding-decoding structure module includes a convolutional layer configured to directly process an input, a number of residual network blocks without Batch-Normalization (BN) layers, two downsampling convolutional layers, and two deconvolutional layers; a plurality of skip connections are provided between features of a same scale in the encoding-decoding structure; an output of the encoding-decoding structure module is the deblurring feature $\Phi_{deblur}$; and a pixel regression network composed of two convolutional layers is connected after the encoding-decoding structure to generate a low-resolution sharp image $\hat{L}$.

Further, in the step 2, a module for extracting a super-resolution feature includes a convolutional layer configured to directly process an input, and a number of residual network blocks without BN layers, and an output of the branch module is a super-resolution feature $\Phi_{SRF}$.

Further, in the step 2, the feature fusion module includes two convolutional layers performing the adaptive fusion on the features extracted by the two branch modules by outputting a pixel-wise fusion weight, and the feature fusion module takes {$l_{blur}$, $\Phi_{SRF}$, $\Phi_{deblur}$} as an input, and performs the adaptive fusion on $\Phi_{SRF}$, $\Phi_{deblur}$ according to a formula $\Phi_{fusion}=G_{fusion}(l_{blur}, \Phi_{SRF}, \Phi_{deblur}) \otimes \Phi_{deblur}+\Phi_{SRF}$, where $G_{fusion}$ denotes a network for the feature fusion module, and $\otimes$ denotes element-wise multiplication.

Further, in the step 2, the upsampling reconstruction module takes a feature $\Phi_{deblur}$ obtained after fusion as an input, adopts a number of residual network blocks without BN layers to optimize and refine the fused feature, and achieves a recovery of a high-resolution sharp image $\hat{H}$ through two pixel shuffle layers and a number of convolutional layers.

Further, in the step 3, a loss function used for network training is defined as $L=L_{SR}(\hat{H}, H)+\alpha L_{deblur}(\hat{L}, L)$, where $L_{SR}$ and $L_{deblur}$ denote an output error of the upsampling reconstruction module and an output error of a deblurring module, respectively, and both use a Mean Square Error (MSE) function to calculate a distance between an output of an output network and a true value, and a denotes a weight between two losses.

Further, a two-stage training strategy is adopted when training a model of the step 2; in a first stage of training, a pixel-wise fusion weight of a feature fusion network is mandatory to be 1, and all parts except the feature fusion module are updated; in a second stage of training, a weight restriction is cancelled, and on a basis of the first stage of training, the entire network is retrained together with the feature fusion module; and in a whole training process, an Adaptive Moment Estimation (ADAM) optimization algorithm is adopted for optimization, and to increase a diversity of training data, a random horizontal flip and a random rotation are adopted to perform data enhancement on the generated plurality of triples of image patches.

Further, in the step 4, an image to be tested is preprocessed by edge trimming in such a manner that the image to be tested has a length and a width that are divisible by four.

Compared with the related art, the present disclosure has the following technical effects.

The method for super-resolution and non-uniform motion deblurring of a natural image based on a deep feature fusion network according to the present disclosure achieves recovery of the low-resolution non-uniform motion-blurred image based on the deep neural network for the first time. The network of the present disclosure effectively decouples the aforementioned joint task into two subtasks through two parallel branch modules for feature extraction, thereby reducing the difficulty of network training and improving the effect of the network. In addition, the existence of the feature fusion module enables the network to better fuse features of different subtasks. Finally, since most calculations of the network are concentrated on low-resolution scales, the method has an extremely high computational efficiency and good real-time performance, and thus is very suitable for applications such as restoration and enhancement on images captured by mobile devices and monitoring equipment.

DESCRIPTION OF EMBODIMENTS

The present disclosure will be further described below in combination with the drawings.

A fusion network-based method for image super-resolution and non-uniform motion deblurring includes the following steps.

In step 1, an original video is preprocessed to obtain a set of triples of image patches as training data and testing. A number of segments of videos captured by a high-speed motion camera are converted into multiple triples of image patches $\{l_{blur}, l, h\}$ that are spatially aligned, where $l_{blur}$ denotes a non-uniform motion-blurred image patch at a low resolution and serves as an input of neural network training; and l and h denote a low-resolution sharp image patch and a high-resolution sharp image patch, respectively, and serve as true values of different branches in the neural network training.

In step 2, a deep neural network is built. The deep neural network uses two branch modules to respectively extract features for image super-resolution and for non-uniform motion deblurring, and performs adaptive fusion on the features extracted by the two branch modules through a feature fusion module that is trainable. An upsampling reconstruction module is used to perform a super-resolution and non-uniform motion deblurring task.

In step 3, model training is performed. The triples of image patches of a training set obtained in the step 1 are used to update parameters of the built neural network to obtain a network model for restoring a low-resolution non-uniform motion-blurred image.

In step 4, model test is performed. The low-resolution non-uniform motion-blurred image to be processed is preprocessed, and the low-resolution non-uniform motion-blurred image is inputted into a neural network model that has been trained, to obtain a high-resolution sharp image.

A process of generating the triples of image patches in the step 1 includes:

substep 1: randomly sampling N frames of images from a plurality of segments of real-scene videos as a set H of ground truth images of the training set; for each frame of image $H_i$ in the set of ground truth images, sampling, by taking the frame of image $H_i$ as a center, M frames of images adjacent to the frame of image $H_i$ and the frame of image $H_i$ to form a set T of images, $T=\{H_{i-(M-1)/2}, \ldots, H_i, \ldots, H_{i+(M-1)/2}\}$, where a subscript denotes a frame number of an image; and generating the set T of images into a set $H_{blur}$ of high-resolution blurred images based on a formula $$H_{blur} = g\left(\frac{1}{M}\sum_{i=0}^{M-1} g^{-1}(H_i)\right),$$

where M denotes a number of consecutive frames for generating non-uniform motion-blurred images, $H_i$ denotes an i-th frame of image captured by the high-speed motion camera, and g denotes a camera response function configured to represent a mapping relationship between a brightness received by a photosensitive element and a pixel value of an image that is captured, an approximate function of g being $g(x)=x^{1/\gamma}$; and substep 2: for N pairs of high-resolution sharp/blurred images $\{H, H_{blur}\}$ generated in the substep 1, downsampling each of the N pairs of high-resolution sharp/blurred images $\{H, H_{blur}\}$ with three zooming scales $\{0.5, 0.7, 1\}$ to obtain 3*N pairs of high-resolution sharp/blurred images; for the 3*N pairs of high-resolution sharp/blurred images, cropping a set of image patches of a size M*M using a sliding window with a stride of S; for each pair of high-resolution image patches $\{h, h_{blur}\}$, performing downsampling using a formula L=D(H) to obtain a pair of low-resolution image patches $\{l, l_{blur}\}$, where D denotes a downsampling interpolation algorithm, H denotes a high-resolution image, and L denotes a low-resolution image obtained after the downsampling; and obtaining each of the plurality of pairs of triples of image patches $\{l_{blur}, l, h\}$ in the step 1, the downsampling being bicubic interpolation downsampling.

In the step 2, a module of the neural network for extracting a deblurring feature adopts an encoding-decoding structure, the encoding-decoding structure module comprises a convolutional layer configured to directly process an input, a number of residual network blocks without BN layers, two downsampling convolutional layers, and two deconvolutional layers. A plurality of skip connections are provided between features of a same scale in the encoding-decoding structure; an output of the encoding-decoding structure module is the deblurring feature $\Phi_{deblur}$; and a pixel regression network composed of two convolutional layers is connected after the encoding-decoding structure to generate a low-resolution sharp image $\hat{L}$.

In the step 2, a module for extracting a super-resolution feature comprises a convolutional layer configured to directly process an input, and a number of residual network blocks without BN layers, and an output of the branch module is a super-resolution feature $\Phi_{SRF}$.

In the step 2, the feature fusion module comprises two convolutional layers performing the adaptive fusion on the features extracted by the two branch modules by outputting a pixel-wise fusion weight, and the feature fusion module takes $\{l_{blur}, \Phi_{SRF}, \Phi_{deblur}\}$ as an input, and performs the adaptive fusion on $\Phi_{SRF}, \Phi_{deblur}$ according to a formula $\Phi_{fusion}=G_{fusion}(l_{blur}, \Phi_{SRF}, \Phi_{deblur}) \otimes \Phi_{deblur}+\Phi_{SRF}$, where $G_{fusion}$ denotes a network for the feature fusion module, and $\otimes$ denotes element-wise multiplication.

In the step 2, the upsampling reconstruction module takes a feature $\Phi_{deblur}$ obtained after fusion as an input, adopts a number of residual network blocks without BN layers to optimize and refine the fused feature, and achieves a recovery of a high-resolution sharp image $\hat{H}$ through two pixel shuffle layers and a number of convolutional layers.

In the step 3, a loss function used for network training is defined as $L=L_{SR}(\hat{H}, H)+\alpha L_{deblur}(\hat{L}, L)$, where $L_{SR}$ and $L_{deblur}$ denote an output error of the upsampling reconstruction module and an output error of a deblurring module, respectively, and both use a MSE function to calculate a distance between an output of an output network and a true value, and a denotes a weight between two losses.

A two-stage training strategy is adopted when training a model of the step 2; in a first stage of training, a pixel-wise fusion weight of a feature fusion network is mandatory to be 1, and all parts except the feature fusion module are updated; in a second stage of training, a weight restriction is cancelled, and on a basis of the first stage of training, the entire network is retrained together with the feature fusion module; and in a whole training process, an Adaptive Moment Estimation (ADAM) optimization algorithm is adopted for optimization, and to increase a diversity of training data, a random horizontal flip and a random rotation are adopted to perform data enhancement on the generated plurality of triples of image patches.

In the step 4, an image to be tested is preprocessed by edge trimming in such a manner that the image to be tested has a length and a width that are divisible by four.

A flow chart of implementation will be described as follows.

Figure 1:
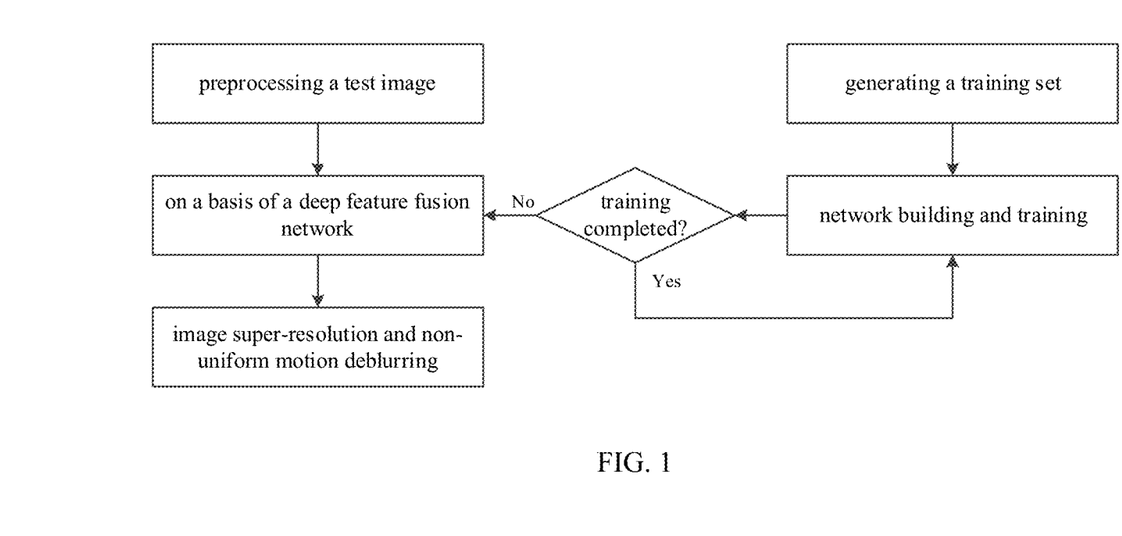
FIG. 1 is a flowchart of an implementation of the present disclosure.

As illustrated in FIG. 1, the fusion network-based method for the image super-resolution and non-uniform motion deblurring includes the following steps.

In step 1, an original video is preprocessed to obtain a set of training data of an image. A plurality of segments of clear videos of natural scenes captured by the high-speed motion camera into a plurality of pairs of triples of image patches $\{l_{blur}, l, h\}$ that are spatially aligned, where $l_{blur}$ denotes a non-uniform motion-blurred image patch at a low resolution and serves as an input of neural network training; and l and h denote a low-resolution sharp image patch and a high-resolution sharp image patch, respectively, and serve as true values of different stages in the neural network training.

Specifically, with the method, 2,100 frames of images are randomly selected from 21 segments of videos to form the set H of ground truth images of the training set. In addition, according to the method, 11 frames of images adjacent to the 2,100 frames of images are processed by the formula $$H_{blur} = g\left(\frac{1}{M}\sum_{i=0}^{M-1} g^{-1}(\hat{H}[i])\right)$$

to generate the set $H_{blur}$ of high-resolution blurred images. In this manner, a total of 2,100 pairs of high-resolution sharp/blurred images $\{H, H_{blur}\}$ are generated. Each of the 2,100 pairs of high-resolution sharp/blurred images $\{H, H_{blur}\}$ is downsampled with three zooming scales $\{0.5, 0.7, 1\}$ to obtain 6,300 pairs of high-resolution sharp/blurred images. For the 6,300 pairs of high-resolution sharp/blurred images, a pair of image patches of a size 256*256 is cropped using a sliding window with a stride of 128. A total of 107,584 pairs of image patches are cropped from the above pairs of images. A formula $g(x)=x^{1/\gamma}$ is applied to each pair of high-resolution image patches $\{h, h_{blur}\}$. The method performs the downsampling to obtain the pair of low-resolution image patches $\{l, l_{blur}\}$, and to obtain the pairs of triples of image patches $\{l_{blur}, l, h\}$ in the step 1. The downsampling is bicubic interpolation downsampling.

Figure 2:
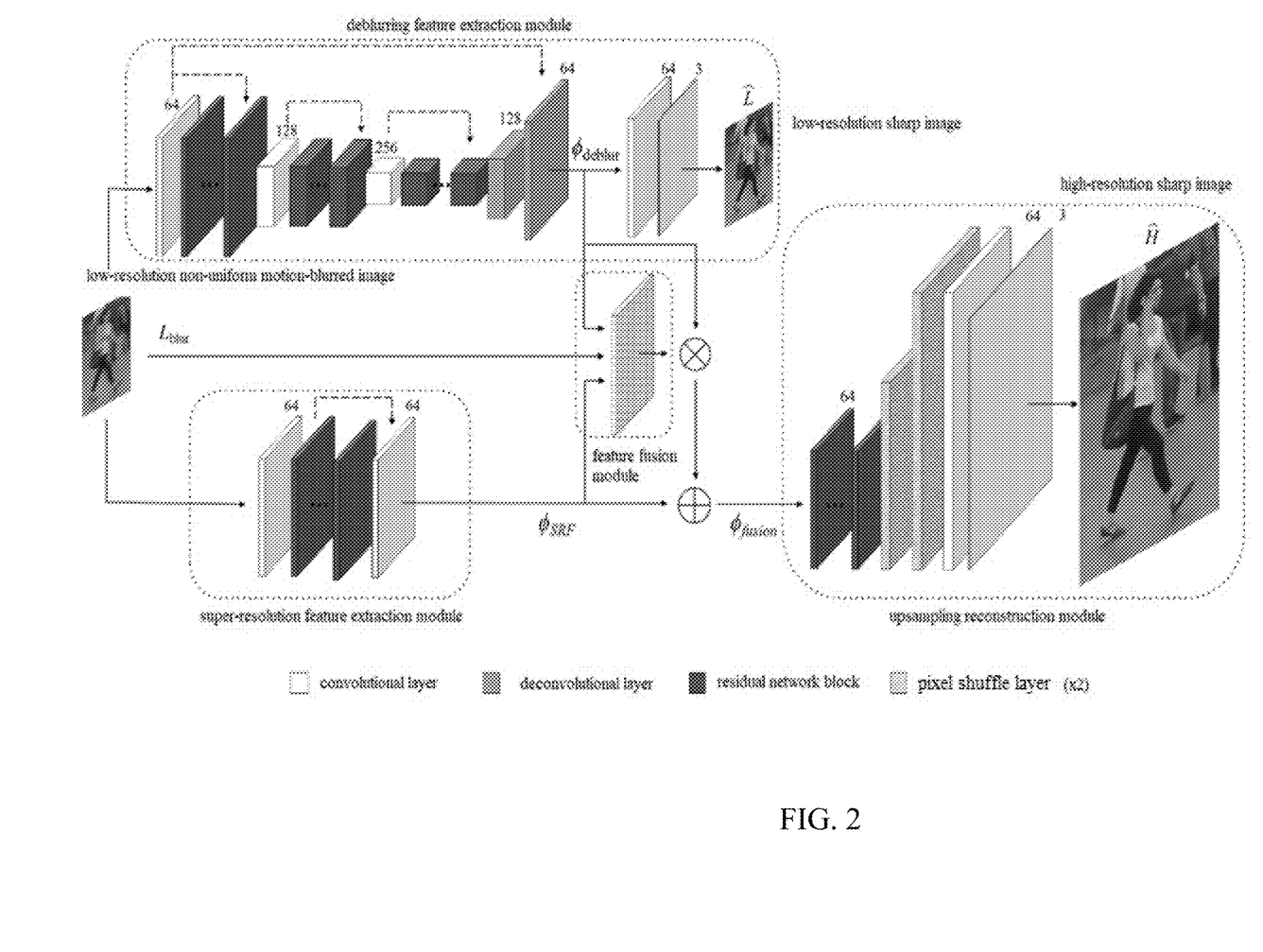
FIG. 2 illustrates an architecture of a convolutional neural network of the present disclosure.

In step 2, the deep neural network is built. As illustrated in FIG. 2, The deep neural network uses two branch modules to respectively extract features for the image super-resolution and for the non-uniform motion deblurring, and performs adaptive fusion on outputs of the two feature extraction branches through a feature fusion module that is trainable. And then, the upsampling reconstruction module is used to implement the super-resolution and non-uniform motion deblurring task.

A blur feature extraction module adopts an encoding-decoding structure to increase a receptive field of a feature extraction network, so as to deal with a possible large-scale blur phenomenon. The encoding-decoding structure is composed of "C1-Res(1-6)-C2-Res(7-12)-C3-Res(13-18)-D1-D2-C4". C1 is a convolutional layer with a convolution kernel size of 7*7, and an output channel number of 64. Res denotes a residual network block with the BN layer removed. Each residual network block is composed of a convolutional layer with a convolution kernel size of 3*3, an activation function Leaky-ReLU with a slope of 0.2, and a convolutional layer with a convolution kernel size of 3*3, which are connected in sequence. Finally, the entire residual network block is added in series from end to end to form a final output. Res(1-6) denotes six residual network blocks connected in series, of which a number of output channels of all convolutional layers is 64. C2 is a convolutional layer with a convolution kernel size of 3*3 and a stride of 2, and a number of output channels of C2 is 128. C2 plays a role of downsampling a feature map. Res(7-12) denotes six residual network blocks connected in series, of which a number of output channels of all convolutional layers is 128. C3 is a convolutional layer with a convolutional kernel size of 3*3 and a stride of 2, and a number of output channels of C3 is 256. C3 plays a role of downsampling the feature map. Res (13-18) denotes six residual network blocks connected in series, of which a number of output channels of all convolutional layers is 256. D1 is composed of a deconvolutional layer with a convolution kernel size of 4*4 and a stride of 2, and the activation function Leaky-ReLU. A number of output channels of D1 is 128. D1 plays a role of upsampling the feature map. D2 is composed of a deconvolutional layer with a convolution kernel size of 4*4 and a stride of 2, and the activation function Leaky-ReLU. A number of output channels of D2 is 64. D2 plays a role of upsampling the feature map. C4 is a convolutional layer with a convolution kernel size of 7*7, and a number of output channels of C4 is 64. A skip connection is provided between an output of Res6 and an output of C1, between an output of Res12 and an output of C2, and between an output of C1 and an output of C4. An output of the encoding-decoding structure module is the deblurring feature $\Phi_{deblur}$.

In addition, a pixel regression network composed of two convolutional layers is connected after the encoding-decoding structure. A structure of the pixel regression network is composed of "C5-C6". C5 is composed of a convolutional layer with a convolution kernel size of 3*3 and the activation function Leaky-ReLU. A number of output channels of C5 is 64. C6 is a convolutional layer with a convolution kernel size of 3*3, and a number of output channels of C6 is 3. The pixel regression network will eventually generate the low-resolution sharp image $\hat{L}$.

A module structure for extracting super-resolution features according to the method is "C7-Res(19-26)-C8". C7 is a convolutional layer with a convolution kernel size of 7*7, and a number of output channels of C7 is 64. Res(19-26) denotes six residual network blocks connected in series, of which a number of output channels of all convolutional layers is 64. C8 is a convolutional layer with a convolution kernel size of 3*3, and a number of output channels of C8 is 64. A skip connection is provided between an output of C7 and an output of C8. An output of this branch is the super-resolution feature $\Phi_{SRF}$.

The feature fusion module according to the method performs the adaptive fusion on the features extracted by the feature extraction branches by outputting a pixel-wise fusion weight. Specifically, the feature fusion module takes {$l_{blur}$, $\Phi_{SRF}$, $\Phi_{deblur}$} as an input, and performs feature fusion on $\Phi_{SRF}$, $\Phi_{deblur}$ with the formula $\Phi_{fusion}=G_{fusion}(l_{blur}, \Phi_{SRF}, \Phi_{deblur}) \otimes \Phi_{deblur}\Phi_{SRF}$.

A structure of the feature fusion module is composed of "C9-C10-MUL". C9 is composed of a convolutional layer with a convolution kernel size of 3*3 and the activation function Leaky-ReLU, and a number of output channels of C9 is 64. C10 is a convolutional layer with a convolution kernel size of 1*1, and a number of output channels of C10 is 64. MUL denotes an element-wise multiplication layer, which is responsible for a product of a fusion weight outputted by C10 and $\Phi_{deblur}$. An output of MUL and $\Phi_{SRF}$ are summed point by point to obtain a final fused feature $\Phi_{fusion}$.

The upsampling reconstruction module according to the method takes the fused feature $\Phi_{fusion}$ as an input to achieve the recovery of the high-resolution sharp image $\hat{H}$. A structure of the upsampling reconstruction module is composed of "Res(27-34)-C11-P1-C12-P2-C13-C14". Res(27-34) denotes six residual network blocks connected in series, of which a number of output channels of all convolutional layers is 64. C11 is a convolutional layer with a convolution kernel size of 3*3, and a number of output channels of C11 is 256. P1 is composed of a pixel shuffle layer and the activation function Leaky-ReLU. A number of output channels of P1 is 64. P1 plays a role of performing two-fold upsampling on the feature map. C12 is a convolutional layer with a convolution kernel size of 3*3, and a number of output channels of C12 is 256. P2 is composed of a pixel shuffle layer and the activation function Leaky-ReLU, and a number of output channels of P2 is 64. P2 plays a role of performing two-fold upsampling on the feature map. C13 is composed of a convolutional layer with a convolution kernel size of 3*3 and the activation function Leaky-ReLU. A number of output channels of C13 is 64. C14 is a convolutional layer with a convolution kernel size of 3*3, and a number of output channels of C14 is 3, that is, the final high-resolution sharp result $\hat{H}$.

In step 3, the model training is performed by using the triples of image patches of the training set obtained in the step 1 to update the parameters of the built neural network, so as to obtain the network model for restoring the low-resolution non-uniform motion-blurred image. The loss function used in the network training is defined as $L=L_{SR}(\hat{H}, H)+\alpha L_{deblur}(\hat{L}, L)$, where $L_{SR}$ and $L_{deblur}$ denote the output error of the upsampling reconstruction module and the output error of the deblurring module, respectively, and both use the MSE (mean square error) function to calculate the distance between the output of the output network and the true value, and a denotes the weight between two losses.

The training process is divided into two stages. In the first stage of training, the pixel-wise fusion weight obtained by the feature fusion network is mandatory to be 1, and all network layers except the feature fusion module are updated. In the first stage, a number of Epochs is set to 60, an initial learning rate is set to 1e−4, a learning rate decays to 0.2 times a previous value every 8 epochs, Batch size is set to 16, and a weight a between loss functions is set to 1. In the second stage of training, the above restrictions are cancelled, and on the basis of the first stage of training, the entire network is updated together with the feature fusion module. In the second stage, the number of Epochs is set to 50, the initial learning rate is set to 5e−5, the learning rate decays to 0.2 times the previous value every 8 epochs, the Batch size is set to 16, and the weight a between the loss functions is set to 0.5. Both of the two stages of optimization adopt the ADAM optimization algorithm. In order to increase the diversity of the training data, the random horizontal flip and four random angles, $$\left[0, \frac{\pi}{2}, \pi, \frac{3\pi}{2}\right],$$

of rotation are adopted to perform the data enhancement on the generated triples of image patches.

In step 4, the model test is performed. First, the image to be tested is preprocessed by the edge trimming in such a manner that the length and the width of the image to be tested are divisible by four, thereby resulting in that the feature map obtained by the encoding-decoding network is consistent with the size of the inputted image. And then, a test image processed is inputted to the neural network model trained in step 3 to obtain the high-resolution sharp image.

Figure 3A:
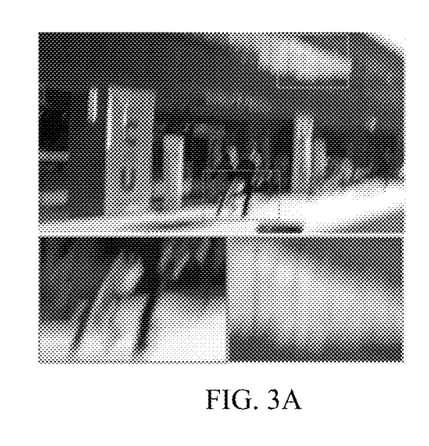
FIG. 3A and FIG. 3B are examples illustrating image super-resolution and non-uniform motion deblurring.
Figure 3B:
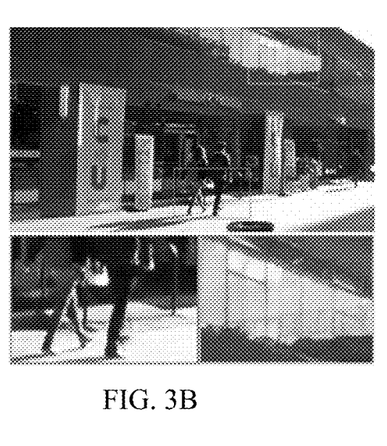

FIGS. 3A and 3B illustrate an example of recovering a low-resolution non-uniform motion-blurred image. FIG. 3A illustrates a low-resolution non-uniform motion-blurred image that is inputted; and FIG. 3B illustrates a high-resolution sharp image obtained by the above neural network model.

The present disclosure may be implemented by a variety of programming languages, such as C++, python, matlab, etc. The description in the specification is for illustrative purposes only, and should not be considered as limiting. The scope of the present disclosure is limited only by the attached claims.

What is claimed is:

1. A fusion network-based method for image super-resolution and non-uniform motion deblurring, comprising:
   step 1: preprocessing an original video to obtain a set of triples of image patches as training and testing data: converting a number of segments of videos captured by a high-speed motion camera into a plurality of triples of image patches {$l_{blur}$, l, h} that are spatially aligned, where $l_{blur}$ denotes a non-uniform motion-blurred image patch at a low resolution and serves as an input of neural network training; and l and h denote a low-resolution sharp image patch and a high-resolution sharp image patch, respectively, and serve as true values of different branches in the neural network training;
   step 2: building a deep neural network: using, by the deep neural network, two branch modules to respectively extract features for image super-resolution and for non-uniform motion deblurring, and performing, by the deep neural network, adaptive fusion on the features extracted by the two branch modules through a feature fusion module that is trainable; and using an upsampling reconstruction module to perform a super-resolution and non-uniform motion deblurring task:
   step 3: model training: using the triples of image patches of a training set obtained in the step 1 to update parameters of the built neural network to obtain a deep neural network model for restoring a low-resolution non-uniform motion-blurred image; and step 4: model testing: preprocessing the low-resolution non-uniform motion-blurred image to be processed, and inputting the low-resolution non-uniform motion-blurred image into the deep neural network model that has been trained, to obtain a high-resolution sharp image, wherein in the step 2, a module of the neural network for extracting a deblurring feature adopts an encoding-decoding structure, the encoding-decoding structure module comprises a convolutional layer configured to directly process an input, a number of residual network blocks without Batch-Normalization (BN) layers, two downsampling convolutional layers, and two deconvolutional layers; a plurality of skip connections are provided between features of a same scale in the encoding-decoding structure; an output of the encoding-decoding structure module is the deblurring feature $\Phi_{deblur}$; and a pixel regression network composed of two convolutional layers is connected after the encoding-decoding structure to generate a low-resolution sharp image $\hat{L}$;

wherein in the step 2, a module for extracting a super-resolution feature comprises a convolutional layer configured to directly process an input, and a number of residual network blocks without Batch-Normalization (BN) layers, and an output of the branch module is a super-resolution feature $\Phi_{SRF}$; and wherein in the step 2, the upsampling reconstruction module takes a feature $\Phi_{deblur}$ obtained after fusion as an input, adopts a number of residual network blocks without the BN layers to optimize and refine the fused feature, and achieves a recovery of a high-resolution sharp image $\hat{H}$ through two pixel shuffle layers and a number of convolutional layers.

2. The method of claim 1, wherein a process of generating the triples of image patches in the step 1 comprises:

substep 1: randomly sampling N frames of images from a plurality of segments of real-scene videos as a set H of ground truth images of the training set; for each frame of image $H_i$ in the set of ground truth images, sampling, by taking the frame of image $H_i$ as a center, M frames of images adjacent to the frame of image $H_i$ and the frame of image $H_i$ to form a set T of images, T= $\{H_{i-(M-1)/2} \ldots, H_i \ldots, H_{i+(M-1)/2}\}$, where a subscript denotes a frame number of an image; and generating the set T of images into a set $H_{blur}$ of high-resolution blurred images based on a formula $$H_{blur} = g\left(\frac{1}{M}\sum_{i=0}^{M-1} g^{-1}(H_i)\right),$$

where M denotes a number of consecutive frames for generating non-uniform motion-blurred images, $H_i$ denotes an i-th frame of image captured by the high-speed motion camera, and g denotes a camera response function configured to represent a mapping relationship between a brightness received by a photosensitive element and a pixel value of an image that is captured, an approximate function of g being $g(x)=x^{1/\gamma}$; and substep 2: for N pairs of high-resolution sharp/blurred images $\{H, H_{blur}\}$ generated in the substep 1, downsampling each of the N pairs of high-resolution sharp/blurred images $\{H, H_{blur}\}$ with three zooming scales $\{0.5, 0.7, 1\}$ to obtain 3*N pairs of high-resolution sharp/blurred images; for the 3*N pairs of high-resolution sharp/blurred images, cropping a set of image patches of a size M*M using a sliding window with a stride of S; for each pair of high-resolution image patches $\{h, h_{blur}\}$, performing downsampling using a formula L=D(H) to obtain a pair of low-resolution image patches $\{l, l_{blur}\}$, where D denotes a downsampling interpolation algorithm, H denotes a high-resolution image, and L denotes a low-resolution image obtained after the downsampling; and obtaining each of the plurality of pairs of triples of image patches $\{l_{blur}, l, h\}$ in the step 1, the downsampling being bicubic interpolation downsampling.

3. The method of claim 1, wherein in the step 2, the feature fusion module comprises two convolutional layers performing the adaptive fusion on the features extracted by the two branch modules by outputting a pixel-wise fusion weight, and the feature fusion module takes $\{l_{blur}, \Phi_{SRF}, \Phi_{deblur}\}$ as an input, and performs the adaptive fusion on $\Phi_{SRF}, \Phi_{deblur}$ according to a formula $\Phi_{fusion}=G_{fusion}(l_{blur}, \Phi_{SRF}, \Phi_{deblur}) \otimes \Phi_{deblur}+\Phi_{SRF}$, where $G_{fusion}$ denotes a network for the feature fusion module, and $\otimes$ denotes element-wise multiplication.

4. The method of claim 1, wherein in the step 3, a loss function used for network training is defined as $L=L_{SR}(\hat{H}, H)+\alpha L_{deblur}(\hat{L}, L)$, where $L_{SR}$ and $L_{deblur}$ denote an output error of the upsampling reconstruction module and an output error of a deblurring module, respectively, and both use a Mean Square Error (MSE) function to calculate a distance between an output of an output network and a true value, and a denotes a weight between two losses.

5. The method of claim 1, wherein a two-stage training strategy is adopted when training a model of the step 2; in a first stage of training, a pixel-wise fusion weight of a feature fusion network is mandatory to be 1, and all parts except the feature fusion module are updated; in a second stage of training, a weight restriction is cancelled, and on a basis of the first stage of training, the entire network is retrained together with the feature fusion module; and in a whole training process, an Adaptive Moment Estimation (ADAM) optimization algorithm is adopted for optimization, and to increase a diversity of training data, a random horizontal flip and a random rotation are adopted to perform data enhancement on the generated plurality of triples of image patches.

6. The method of claim 1, wherein in the step 4, the low-resolution non-uniform motion-blurred image to be tested is preprocessed by edge trimming in such a manner that the image to be tested has a length and a width that are divisible by four.

\* \* \* \* \*